United States Patent
Lim

(10) Patent No.: US 10,730,507 B2
(45) Date of Patent: Aug. 4, 2020

(54) METHOD OF CONTROLLING GEAR SHIFT FOR HYBRID VEHICLE INCLUDING DUAL CLUTCH TRANSMISSION

(71) Applicants: Hyundai Motor Company, Seoul (KR); Kia Motors Corporation, Seoul (KR)

(72) Inventor: Hyun Woo Lim, Whasung-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 156 days.

(21) Appl. No.: 16/181,032

(22) Filed: Nov. 5, 2018

(65) Prior Publication Data
US 2020/0039500 A1 Feb. 6, 2020

(30) Foreign Application Priority Data
Aug. 2, 2018 (KR) .......... 10-2018-0090492

(51) Int. Cl.
| | | |
|---|---|---|
| *B60W 20/15* | (2016.01) | |
| *B60W 10/11* | (2012.01) | |
| *B60W 30/19* | (2012.01) | |
| *B60W 10/113* | (2012.01) | |

(52) U.S. Cl.
CPC .......... *B60W 20/15* (2016.01); *B60W 10/113* (2013.01); *B60W 30/19* (2013.01); *B60W 2510/1005* (2013.01); *B60W 2510/1025* (2013.01); *B60W 2520/105* (2013.01); *B60W 2540/10* (2013.01); *B60W 2710/1022* (2013.01)

(58) Field of Classification Search
CPC .... B60W 20/15; B60W 10/113; B60W 30/19; B60W 2710/1022; B60W 2510/1025; B60W 2520/105; B60W 2540/10; B60W 2510/1005; B60W 2710/1027; F16H 63/50; F16H 2059/147; F16H 59/20; F16H 61/0403; F16H 59/18; F16H 61/688; F16H 3/006; B60Y 2200/92; B60K 6/547; B60K 2006/4825; B60K 6/48

See application file for complete search history.

(56) References Cited

U.S. PATENT DOCUMENTS

| | | | |
|---|---|---|---|
| 2013/0197769 A1* | 8/2013 | Schneider | F16H 61/0403 701/68 |
| 2015/0184599 A1* | 7/2015 | Yokota | F02D 41/0235 123/402 |
| 2019/0061737 A1* | 2/2019 | Goto | B60K 6/445 |

FOREIGN PATENT DOCUMENTS

| | | |
|---|---|---|
| JP | 5741029 B2 | 7/2015 |
| KR | 10-0623746 B1 | 9/2006 |
| KR | 10-1592695 B1 | 2/2016 |

* cited by examiner

*Primary Examiner* — Rodney A Butler
(74) *Attorney, Agent, or Firm* — Morgan, Lewis & Bockius LLP

(57) ABSTRACT

A method of controlling gear shift for a hybrid vehicle with a dual clutch transmission (DCT) may include making a request for reduction in transmission input torque at a time point of entrance into down shift to a first stage from a second stage, determining whether the vehicle is accelerated via manipulation of an accelerator pedal during the down shift, and controlling to begin to gradually reduce an transmission input torque reduction request amount in a torque phase period in which clutch torque is exchanged after a first-stage gear is engaged upon determining that the vehicle is accelerated during the gear shift.

11 Claims, 7 Drawing Sheets

METHOD OF CONTROLLING GEAR SHIFT FOR HYBRID VEHICLE INCLUDING DUAL CLUTCH TRANSMISSION

CROSS REFERENCE TO RELATED APPLICATION

The present application claims priority to Korean Patent Application No. 10-2018-0090492, filed on Aug. 2, 2018, the entire contents of which is incorporated herein for all purposes by this reference.

BACKGROUND OF THE INVENTION

Field of the Invention

The present invention relates to a method of controlling gear shift for a hybrid vehicle with a dual clutch transmission (DCT), for enhancing acceleration linearity while gear shift shock to be generated during near stop gear-shift of a vehicle to a first stage from a second stage.

Description of Related Art

A hybrid vehicle avoids use of an engine in a low-speed driving period and is driven using a motor, thereby enhancing fuel efficiency.

When a vehicle is not driven, it is not required to drive an engine at an idle speed or more and, thus, when a dual clutch transmission (DCT) is applied to such a hybrid vehicle, fuel efficiency may be advantageously enhanced and regenerative braking may always be used during deceleration of a vehicle, thereby maximizing an effect of enhancing fuel efficiency.

With regard to a hybrid DCT vehicle, when the vehicle is reaccelerated according to driver intention during down shift to a first stage from a second stage before the vehicle stops, transmission input torque is enhanced while torque of a driving source is input to a transmission and, thus, near stop gear-shift to a first stage from a second stage transitions to kick down gear-shift to the first stage from the second stage to oscillate and accelerate a vehicle in the first stage along with enhancement in the transmission input torque.

However, since gear engagement and transmission control are performed at low vehicle speed, there is a problem in that acceleration linearity is degraded and shock occurs due to shock and delay due to gear control and clutch control.

This is described in terms of a time point of reacceleration, when an accelerator pedal is depressed at the beginning of gear shift to the first stage from the second stage, kick down control at low vehicle speed (RPM) causes input shaft vibration of each stage due to gear engagement shock and clutch release shock and, thus, when a clutch is engaged in this condition, there is a problem in that vibration and shock of a vehicle are transmitted to a passenger.

As such, when the accelerator pedal is depressed at the end of gear shift to the first stage from the second stage, the vehicle is accelerated after corresponding gear shift is terminated without transition to kick down gear shift to the first stage from the second stage. Accordingly, this control limits input torque until gear shift is terminated and RPM synchronization is delayed and, thus, there is a problem in that the vehicle is accelerated with a significant long time lag after the accelerator pedal is depressed, thereby degrading acceleration response and linearity.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a method of controlling gear shift for a hybrid vehicle with a dual clutch transmission (DCT), for enhancing acceleration linearity while reducing gear shift shock to be generated when the vehicle is accelerated during near stop gear-shift of a vehicle to a first stage from a second stage.

According to an exemplary embodiment of the present invention, a method of controlling gear shift for a hybrid vehicle with a dual clutch transmission (DCT) may include an input torque reduction operation of making a request for reduction in transmission input torque at a time point of entrance into down shift to a first stage from a second stage, by a controller, an acceleration determination operation of determining whether the vehicle is accelerated via manipulation of an accelerator pedal during the down shift, by the controller, and a torque reduction amount decreasing operation of controlling to begin to gradually reduce an transmission input torque reduction request amount in a torque phase period in which clutch torque is exchanged after a first-stage gear is engaged when the controller determines that the vehicle is accelerated during the gear shift.

The torque reduction amount decreasing operation may include determining whether the first-stage gear is completely engaged, determining an acceleration time point via measurement of an accelerator pedal sensor (APS), and when the acceleration time point is a time point before the first-stage gear is completely engaged, reducing the transmission input torque reduction request amount from entrance into the torque phase period after the gear is completely engaged.

The method may further include reducing the transmission input torque reduction request amount from the acceleration time point when the acceleration time point is within the torque phase period after the first-stage gear is completely engaged.

The torque reduction amount decreasing operation may include controlling the transmission input torque reduction request amount to be gradually reduced with a predetermined inclination and the inclination is determined depending on an APS opening amount.

The torque reduction amount decreasing operation may include primarily reducing the transmission input torque reduction request amount in the torque phase period, secondarily reducing the transmission input torque reduction request amount when the APS opening amount is greater than 0 immediately after the torque phase period is terminated, and performing reduction control to linearly connect an inclination based on the primarily reducing and an inclination based on secondarily reducing.

The secondarily reducing of the transmission input torque reduction request amount, which is performed after the torque phase period is terminated, may be performed until current transmission input torque reaches transmission input torque immediately before the transmission input torque is requested to be reduced at the beginning of gear shift.

The method may further include, as a result of the determining of whether the vehicle is accelerated, upon determining that the vehicle is not accelerated, checking the transmission input torque, when the transmission input torque is equal to or less than 0, maintaining a transmission input torque reduction request amount to be requested to be reduced at the beginning of gear shift until the torque phase period is terminated, and when the torque phase period is terminated, releasing transmission input torque reduction request.

The method may further include, as a result of the determining of whether the vehicle is accelerated, upon determining that the vehicle is not accelerated, checking the transmission input torque, when the transmission input torque is greater than 0, maintaining a transmission input torque reduction request amount to be requested to be reduced at the beginning of gear shift until the torque phase period is terminated, and when the torque phase period is terminated, controlling the transmission input torque reduction request amount to be gradually reduced.

The transmission input torque reduction request amount may be controlled to be reduced with a predetermined inclination and the inclination is determined depending on the transmission input torque.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
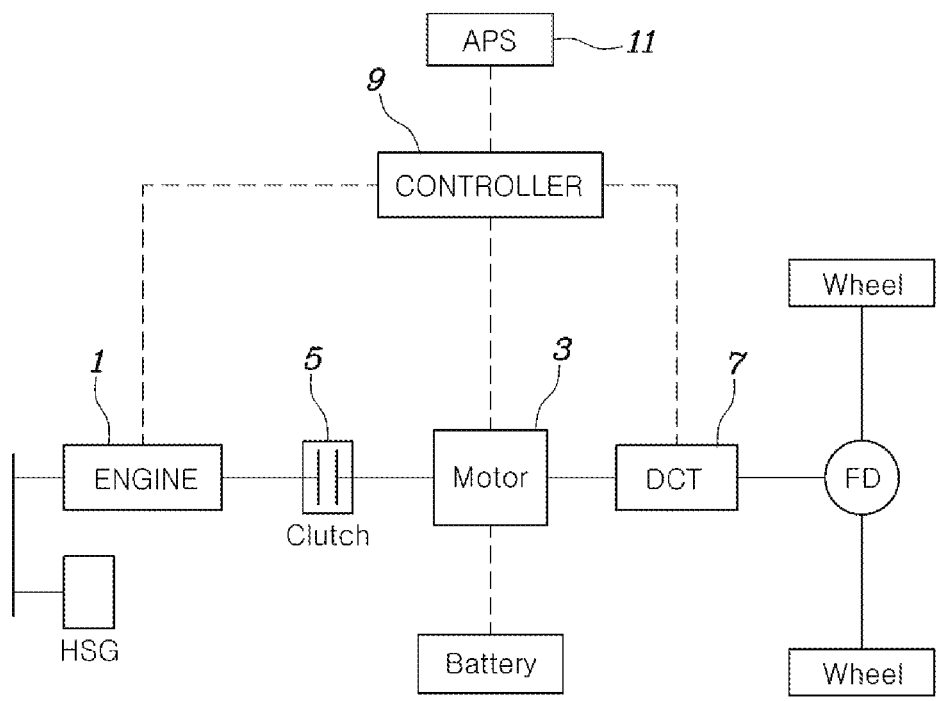
FIG. 1 is a schematic diagram showing a configuration of a power train of a hybrid vehicle including a dual clutch transmission (DCT) disposed therein according to an exemplary embodiment of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the other hand, the invention(s) is/are intended to cover not only the exemplary embodiments, but also various alternatives, modifications, equivalents and other embodiments, which may be included within the spirit and scope of the invention as defined by the appended claims.

Hereinafter, a method of controlling gear shift for hybrid vehicle including dual clutch transmission (DCT) according to embodiments of the present invention is described with reference to the accompanying drawings.

FIG. 1 is a view showing an example of a configuration of a power train of a hybrid vehicle including a dual clutch transmission (DCT) disposed therein according to an exemplary embodiment of the present invention. The present invention relates to a transmission mounted electric device (TMED)-type hybrid vehicle which is configured such that an engine clutch 5 is disposed between an engine 1 and a driving motor 3 and the driving motor 3 is directly connected to a DCT 7.

The DCT 7 includes two clutches and a clutch actuator for engagement or release of the clutches and, in the instant case, these clutches may be classified into an engagement-side clutch and a release-side clutch based on an exchanging operation of a clutch torque.

The DCT 7 may include an odd-stage gear actuator for operating a corresponding synchronization device configured for selection of an odd-stage gear and an even-stage gear actuator for operating a corresponding synchronization device configured for selection of an even-stage gear.

However, this is just for convenience of understanding of the present invention and, thus, the engagement-side clutch and the release-side clutch may be reversed depending on types of a clutch for forming a current transmission stage and a clutch for forming a target transmission stage, a gear arrangement structure, and the like.

Figure 2:
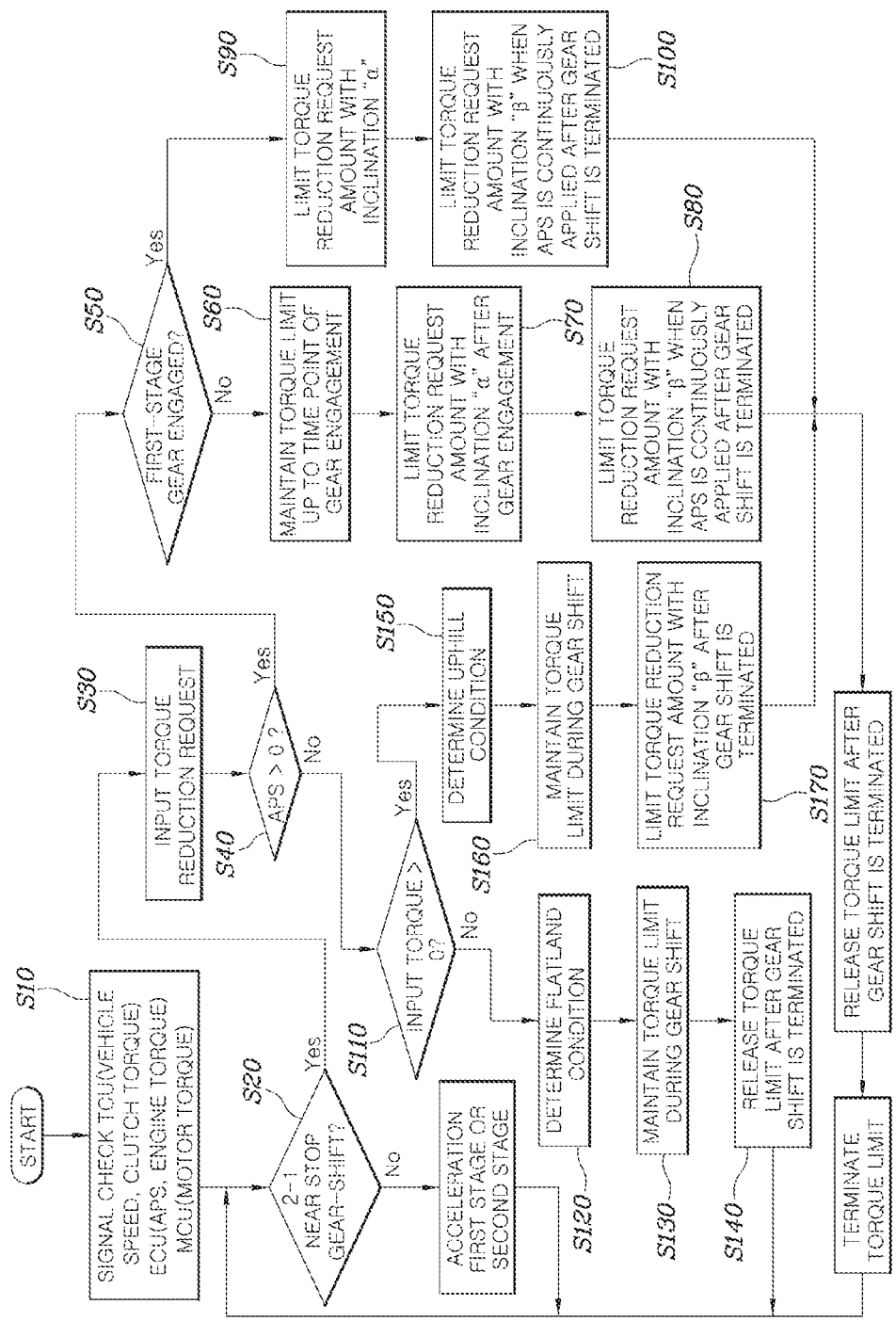
FIG. 2 is a flowchart for explanation of a gear shift control procedure according to an exemplary embodiment of the present invention.
Figure 3:
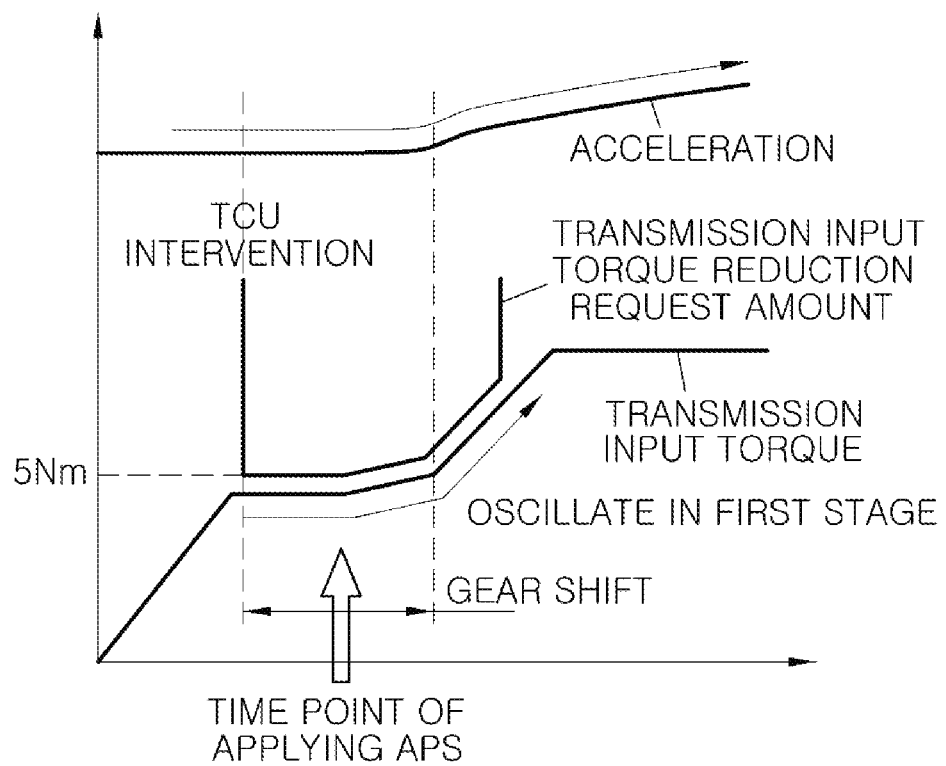
FIG. 3 is a diagram showing a transmission input torque reduction request amount and a behavior of transmission input torque according to torque intervention control according to an exemplary embodiment of the present invention.

A method of controlling gear shift for a hybrid vehicle according to the present invention is now described with reference to the accompanying drawings FIG. 2 and FIG. 3 along with FIG. 1 above. The present invention relates to control of a reduction request amount while a vehicle is accelerated during gear shift and includes an input torque reduction operation, an acceleration determination operation, and a torque reduction amount decreasing operation.

First, in the input torque reduction operation, when a vehicle enters down shift to a first stage from a second stage, a controller 9 may make a request for reduction in transmission input torque. That is, torque intervention (TCU intervention) control for limiting torque input to a transmission may be performed at the beginning of gear shift and, in the instant case, the transmission input torque reduction request amount may be a predetermined value.

In the acceleration determination operation, the controller 9 may determine whether the vehicle is accelerated according to manipulation of an accelerator pedal during the down shift and, that is, may check a measurement value measured by an accelerator pedal sensor (APS) 11 and may determine whether the vehicle is accelerated and a time point of acceleration.

In the torque reduction amount decreasing operation, when the controller 9 determines that the vehicle is accelerated during the gear shift, the transmission input torque reduction request amount may be controlled to begin to be gradually reduced in a torque phase period in which clutch torque is exchanged after a first-stage gear is engaged.

That is, in a gear engagement period in which vibration of an input shaft may occur during gear shift, gear engagement may be completed without enhancement in the transmission input torque and, then, in the torque phase period, the transmission input torque may be controlled to be gradually increased and, thus, gear shift shock during gear engagement may be reduced and acceleration linearity may be enhanced.

According to an exemplary embodiment of the present invention, a time point of reducing the reduction request amount may also be controlled to be changed depending on a time point of acceleration during gear shift.

Figure 4:
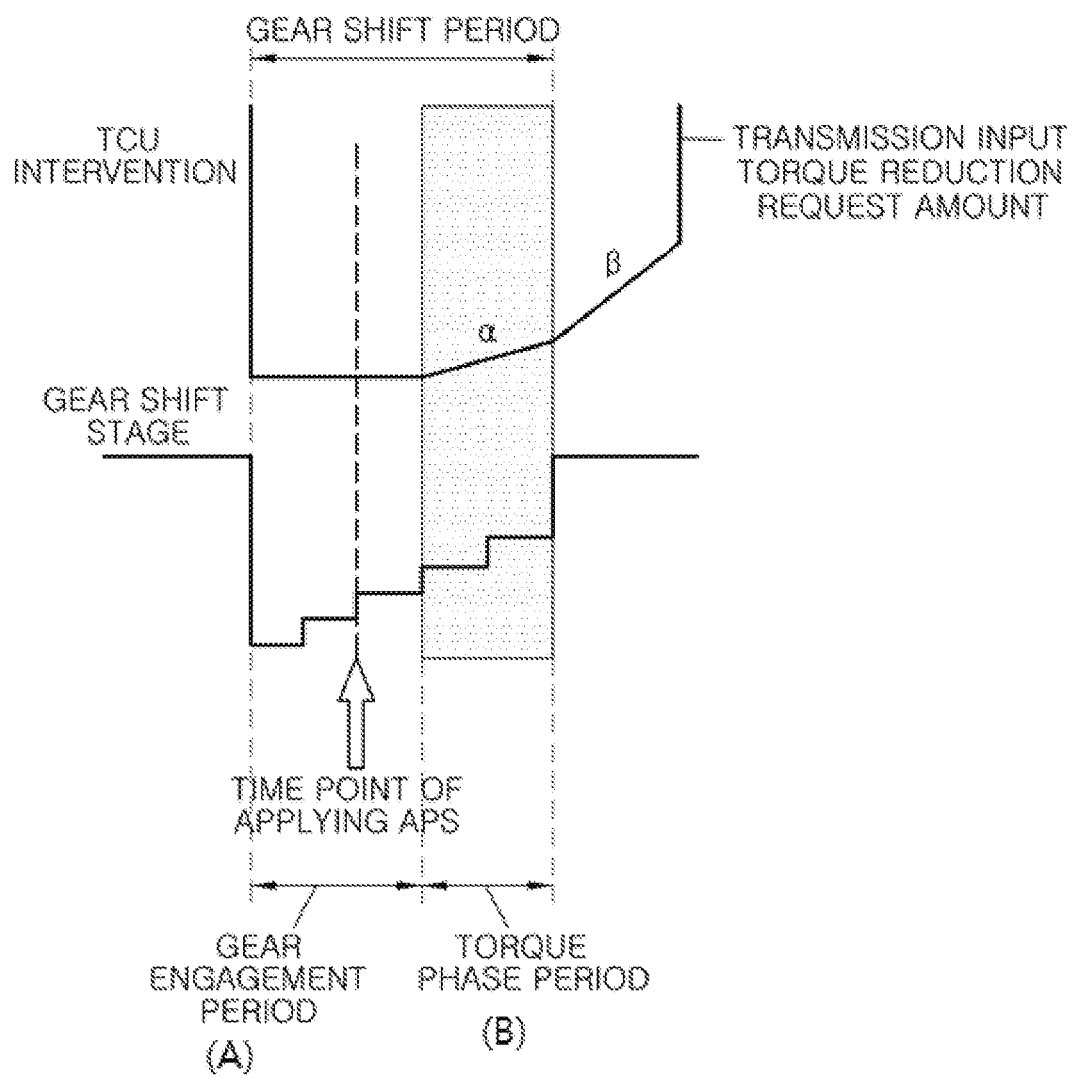
FIG. 4 is a diagram showing a state in which a transmission input torque reduction request amount is changed in a condition in which a vehicle is accelerated prior to gear engagement during near stop gear-shift of a vehicle.

FIG. 4 is a diagram showing a state in which a transmission input torque reduction request amount is changed in a condition in which a vehicle is accelerated prior to gear engagement during near stop gear-shift of the vehicle to a first stage from a second stage.

To the present end, the present invention may include determining whether a first-stage gear is completely engaged, determining an acceleration time point via measurement of an accelerator pedal sensor (APS), and reducing the transmission input torque reduction request amount at a time point of entrance into the torque phase period after the gear engagement is completed if the acceleration time point is a time point before the first-stage gear is completely engaged.

That is, in an entire gear-shift period shown in FIG. 4, period A is a first-stage gear engagement period, and period B is a torque phase period in which clutch torque is exchanged after a gear is completely engaged and, in the instant case, when a vehicle is accelerated in period A in which a first-stage gear is completely engaged during gear shift, a torque limit request amount may be changed from the torque phase period after a standby to period A in which first-stage gear engagement is terminated. Accordingly, transmission input torque may not be enhanced to prevent an input shaft from shaking during gear engagement, reducing gear shift shock.

Figure 5:
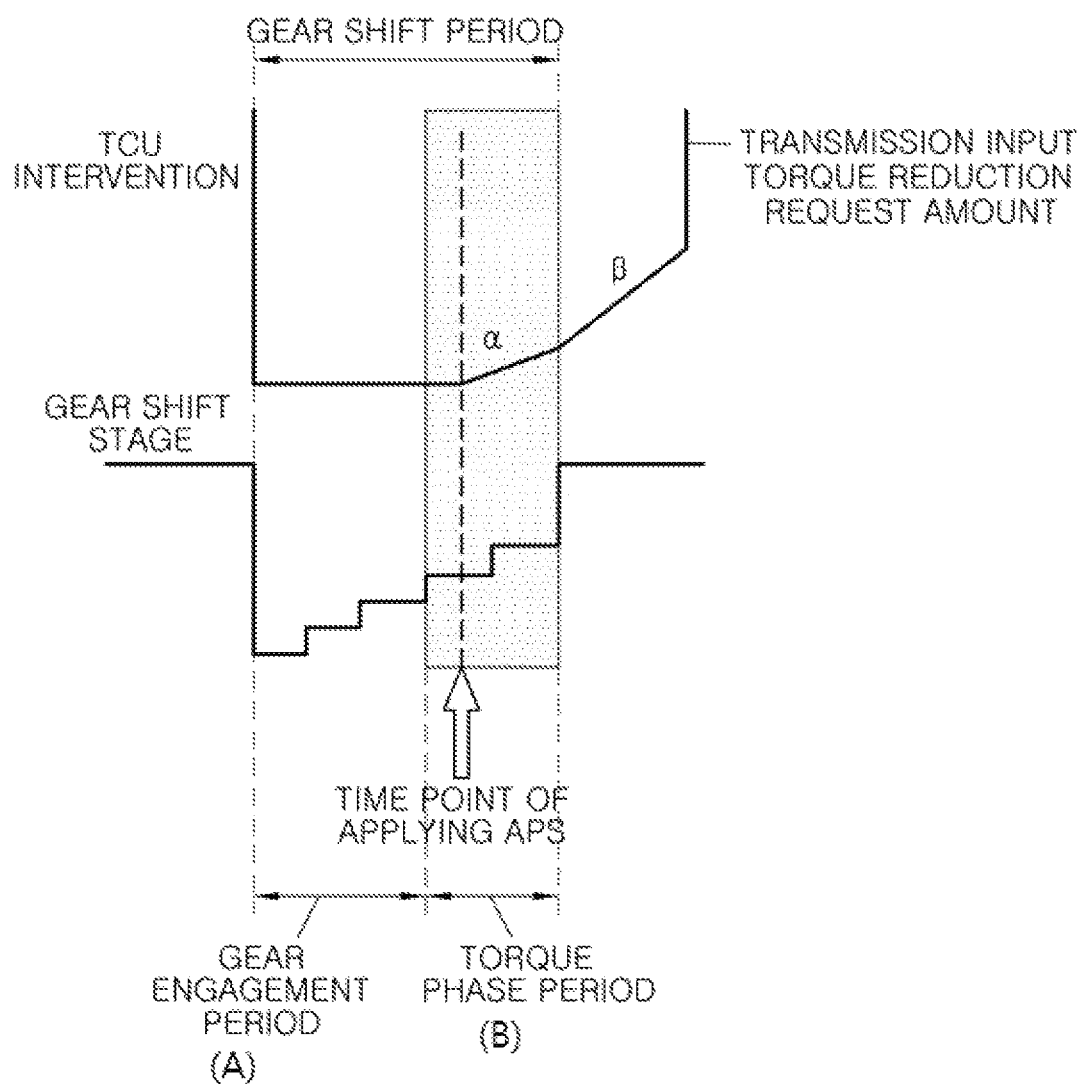
FIG. 5 is a diagram showing a state in which a transmission input torque reduction request amount is changed in a condition in which a vehicle is accelerated after gear engagement during near stop gear-shift of a vehicle.

FIG. 5 is a diagram showing a state in which a transmission input torque reduction request amount is changed in a condition in which a vehicle is accelerated after gear engagement during near stop gear-shift of the vehicle to a first stage from a second stage.

To the present end, the present invention may include determining whether a first-stage gear is completely engaged, determining an acceleration time point via measurement of an accelerator pedal sensor (APS), and reducing the transmission input torque reduction request amount from the acceleration time point when the acceleration time point is within the torque phase period after the first-stage gear is completely engaged.

That is, referring to FIG. 5, when the vehicle is accelerated in period B as a torque phase period after the first-stage gear is completely engaged during gear shift, the torque limit request amount may be changed from the acceleration time point. Meanwhile, period A denotes a first-stage gear engagement period. Accordingly, transmission input torque may not be enhanced to prevent an input shaft from shaking during gear engagement, reducing gear shift shock.

In the torque reduction amount decreasing operation according to an exemplary embodiment of the present invention, the transmission input torque reduction request amount may be controlled to be gradually reduced with a predetermined inclination and, in the instant case, the inclination may be determined depending on an APS opening amount.

For example, the inclination increased in proportion to an APS opening amount and, as the APS opening amount is increased, the torque reduction request amount may be reduced and, thus, the inclination may be more sharply increased.

According to an exemplary embodiment of the present invention, the transmission input torque limit request may be continuously performed even if gear shift is terminated rather than being immediately released after gear shift is terminated.

Referring to FIG. 4 and FIG. 5, in the torque reduction amount decreasing operation according to an exemplary embodiment of the present invention, the transmission input torque reduction request amount may be gradually primarily-reduced in the torque phase period.

When the APS opening amount is greater than 0 immediately after the torque phase period is terminated, the transmission input torque reduction request amount may be gradually secondarily-reduced.

In the instant case, reduction control may be performed such that an inclination $\alpha$ based on the primary reduction and an inclination $\beta$ based on the secondary reduction are linearly connected.

Torque reduction request amount reduction control which is secondarily performed after the torque phase period is terminated may be performed until current transmission input torque reaches transmission input torque immediately before reduction in transmission input torque is requested at the beginning of gear shift.

That is, the inclination $\alpha$ based on the primary reduction may be set in proportion to the APS opening amount to enhance acceleration response and the inclination $\beta$ based on the secondary reduction may be tuned to have linearity with the inclination $\alpha$ based on the primary reduction to enhance acceleration linearity, enhancing vehicle acceleration sense of a driver.

According to an exemplary embodiment of the present invention, when a current condition is not a condition in which a vehicle is accelerated during near stop gear-shift of the vehicle to the first stage from the second stage, torque reduction control of transmission input torque may be differently performed depending on torque input to a transmission.

Figure 6:
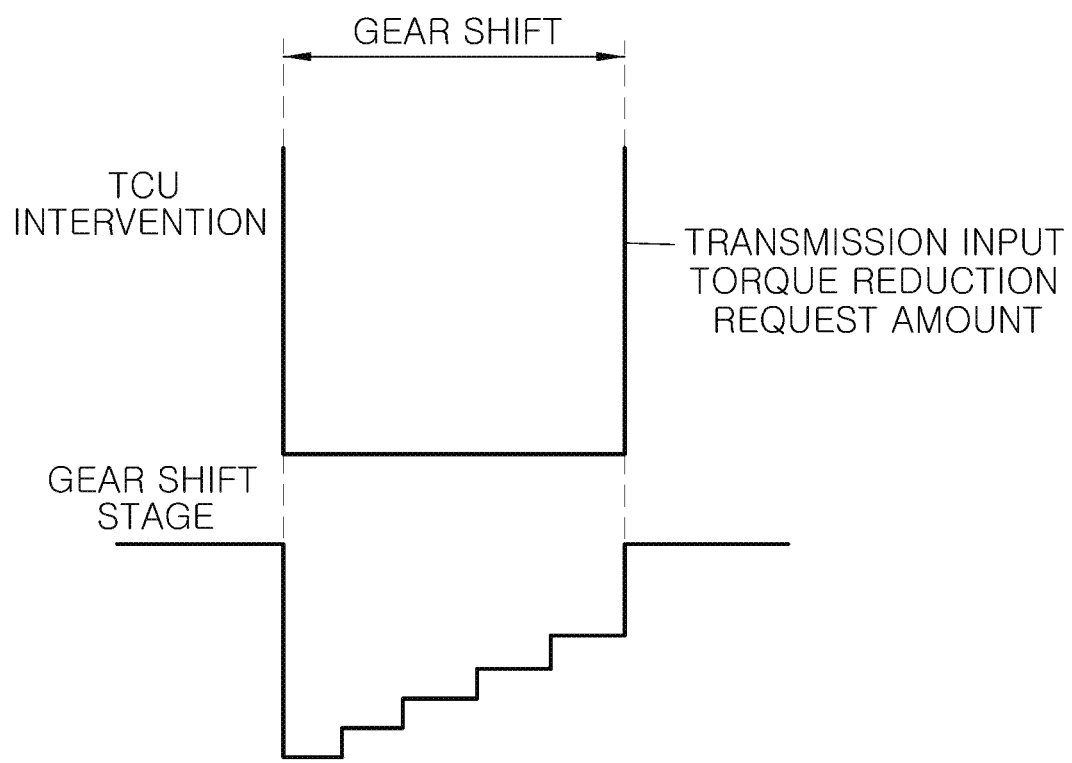
FIG. 6 is a diagram showing a state in which a transmission input torque reduction request amount is changed on the flatland without acceleration during near stop gear-shift of a vehicle.

FIG. 6 is a diagram showing a state in which a transmission input torque reduction request amount is changed on the flatland without acceleration during near stop gear-shift of the vehicle to the first stage from the second stage.

To the present end, the present invention may include checking transmission input torque when a vehicle is not accelerated as a determination result about whether the vehicle is accelerated during gear shift, maintaining the transmission input torque reduction request amount which is requested to be reduced at the beginning of gear shift until the torque phase period is terminated, when the transmission input torque is equal to or less than 0, and releasing the transmission input torque reduction request when the torque phase period is terminated.

That is, when the transmission input torque is 0 or less than 0, it may be determined that stop control is performed on the flatland and, in the instant case, the transmission input torque reduction request amount controlled at the beginning of gear shift may be maintained until gear shift is terminated. However, there is no increase in transmission input torque or creep torque in a flatland section and, thus, the transmission input torque reduction request may be completely released at a time point at which gear shift is terminated.

Figure 7:
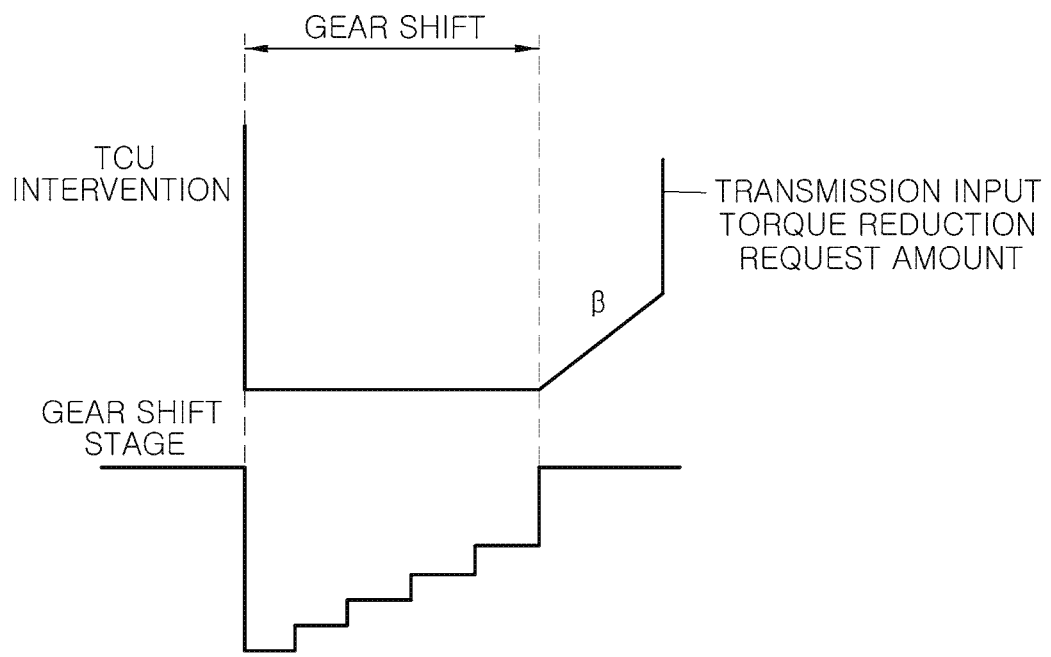
FIG. 7 is a diagram showing a state in which a transmission input torque reduction request amount is changed on an uphill road without acceleration during near stop gear-shift of a vehicle.

FIG. 7 is a diagram showing a state in which a transmission input torque reduction request amount is changed on an uphill road without acceleration during near stop gear-shift of the vehicle to a first stage from a second stage.

To the present end, the present invention may include checking transmission input torque when a vehicle is not accelerated as a determination result about whether the vehicle is accelerated during gear shift, maintaining the transmission input torque reduction request amount which is requested to be reduced at the beginning of gear shift until the torque phase period is terminated, when the transmission input torque is greater than 0, and controlling the transmission input torque reduction request amount to be gradually reduced when the torque phase period is terminated.

That is, when the transmission input torque is greater than 0, the transmission input torque reduction request amount controlled at the beginning of gear shift may also be maintained in the same way until gear shift is terminated. However, there is an increase in transmission input torque or creep torque to prevent a vehicle from slipping on an uphill road in an uphill road section and, thus, the torque reduction request may not be immediately released after gear shift is terminated and, instead, the torque reduction request amount may be controlled to be gradually reduced.

In the instant case, the transmission input torque reduction request amount may be controlled to be gradually reduced with a predetermined inclination and, in the instant case, the inclination may be determined depending on transmission input torque.

Torque reduction request amount reduction control which is performed after the torque phase period is terminated may be performed until current transmission input torque reaches transmission input torque immediately before reduction in transmission input torque is requested at the beginning of gear shift.

A gear shift control procedure according to the present invention is sequentially described with reference to FIG. 2 and, in this regard, vehicle speed, clutch torque, an APS opening amount, an engine torque, motor torque, and the like are verified through the controller 9 such as a Transmission Control Unit (TCU), an ECU, and a MCU (S10).

When a vehicle is driven, whether near stop gear-shift of the vehicle to the first stage from the second stage is performed may be determined (S20), upon determining that near stop gear-shift of the vehicle to the first stage from the second stage begins as the determination result, the transmission input torque may be requested to be reduced (S30), and whether the vehicle is accelerated may be determined by the APS 11 during gear shift (S40).

As the determination result of operation S40, when it is determined that a current state is a state in which the vehicle is accelerated because the APS opening amount is greater than 0, whether the first-stage gear is completely engaged may be determined (S50).

As the determination result of operation S50, when the first-stage gear is not completely engaged, the transmission input torque reduction request amount applied at the beginning of gear shift may be maintained up to a time point at which the first-stage gear is completely engaged as long as the first-stage gear is completely engaged (S60) and, then, the torque reduction request amount may be gradually primarily-reduced in proportion to the APS opening amount after entrance into the torque phase period (S70).

As such, the torque reduction request amount may also be controlled to be gradually reduced after gear shift is completed as the torque phase period is terminated and, in the instant case, the inclination β of the torque reduction request amount controlled to be secondarily reduced may be tuned and controlled to be reduced to have linearity with the inclination α of the torque reduction request amount controlled to be primarily reduced (S80) and, thus, the vehicle may be oscillated to the first stage while the transmission input torque is increased according to the APS opening amount.

As the determination result of operation S50, when it is determined that the first-stage gear is completely engaged, the torque reduction request amount may be controlled to be primarily reduced in proportion to the APS opening amount from the acceleration time point at which the APS opening amount is greater than 0 (S90).

As such, the torque reduction request amount may also be controlled to be gradually reduced after gear shift is completed as the torque phase period is terminated and, in the instant case, the torque reduction request amount may be tuned to have linearity with the inclination α of the torque reduction request amount controlled to be primarily reduced and may be controlled to be secondarily reduced (S100) and, thus, the vehicle may be oscillated to the first stage while the transmission input torque is increased according to the APS opening amount.

As the determination result of operation S40, when it is determined that a current state is not a state in which the vehicle is accelerated because the APS opening amount is not greater than 0, whether the transmission input torque is greater than 0 may be determined (S110).

As the determination result of operation S110, when the transmission input torque is equal to or less than 0, it may be determined that the vehicle is driven on the flatland (S120), the transmission input torque reduction request amount applied at the beginning of gear shift is maintained until gear shift is terminated (S130) and, then, the transmission input torque reduction request may be immediately released after gear shift is terminated (S140).

As the determination result of operation S110, when the transmission input torque is greater than 0, it may be determined that the vehicle is driven on an uphill road (S150) and the transmission input torque reduction request amount applied at the beginning of gear shift may be maintained until gear shift is terminated (S160). However, the torque reduction request amount may also be controlled to be gradually reduced after gear shift is terminated (S170).

As described above, in the gear engagement period in which vibration of an input shaft may occur during gear shift, gear engagement may be completed without enhancement in the transmission input torque and, then, in the torque phase period, the transmission input torque may be controlled to be gradually increased or a limit in torque of the transmission input torque may not be immediately released after gear shift is terminated and, instead, the transmission input torque may be controlled to be gradually increased and, thus, gear shift shock during gear engagement may be reduced and acceleration linearity may be enhanced, enhancing acceleration sense.

Through the above configuration, According to an exemplary embodiment of the present invention, in the gear engagement period in which vibration of an input shaft may occur during gear shift, gear engagement may be completed without enhancement in the transmission input torque and, then, in the torque phase period, the transmission input torque may be controlled to be gradually increased or a limit in torque of the transmission input torque may not be immediately released after gear shift is terminated and, instead, the transmission input torque may be controlled to be gradually increased and, thus, gear shift shock during gear engagement may be reduced and acceleration linearity may be enhanced, enhancing acceleration sense.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of controlling gear shift for a hybrid vehicle with a dual clutch transmission (DCT), the method comprising:
    an input torque reduction operation of making, by a controller, a request for reduction in transmission input torque at a time point of entrance into down shift to a first stage from a second stage;
    an acceleration determination operation of determining, by the controller, when the vehicle is accelerated via checking of manipulation of an accelerator pedal during the down shift; and
    a torque reduction amount decreasing operation of controlling, by the controller, to begin to reduce a transmission input torque reduction request amount in a torque phase period in which clutch torque is exchanged after a first-stage gear is engaged when the controller determines that the vehicle is accelerated during the gear shift.

2. The method of claim 1, wherein the torque reduction amount decreasing operation includes:
    determining when the first-stage gear is completely engaged;
    determining an acceleration time point via measurement of an accelerator pedal sensor (APS); and
    when the acceleration time point is a time point before the first-stage gear is completely engaged, reducing the transmission input torque reduction request amount from entrance into the torque phase period after the first-stage gear is completely engaged.

3. The method of claim 2, further including:
    reducing the transmission input torque reduction request amount from the acceleration time point when the acceleration time point is within the torque phase period after the first-stage gear is completely engaged.

4. The method of claim 1, wherein the torque reduction amount decreasing operation includes:
    controlling the transmission input torque reduction request amount to be reduced with a predetermined inclination and the predetermined inclination is determined depending on an APS opening amount.

5. The method of claim 4, wherein the torque reduction amount decreasing operation further includes:
    primarily reducing the transmission input torque reduction request amount in the torque phase period;
    secondarily reducing the transmission input torque reduction request amount when the APS opening amount is greater than 0 after the torque phase period is terminated; and
    performing reduction control to linearly connect an inclination based on the primarily reducing and an inclination based on secondarily reducing.

6. The method of claim 5, wherein the secondarily reducing of the transmission input torque reduction request amount, which is performed after the torque phase period is terminated, is performed until current transmission input torque reaches transmission input torque before the transmission input torque is requested to be reduced at the beginning of the gear shift.

7. The method of claim 1, further including:
    as a result of the determining of when the vehicle is accelerated, upon determining that the vehicle is not accelerated, checking the transmission input torque;
    when the transmission input torque is equal to or less than 0, maintaining the transmission input torque reduction request amount to be requested to be reduced at the beginning of the gear shift until the torque phase period is terminated; and
    when the torque phase period is terminated, releasing the request for reduction in the transmission input torque.

8. The method of claim 1, further including:
    as a result of the determining of when the vehicle is accelerated, upon determining that the vehicle is not accelerated, checking the transmission input torque;
    when the transmission input torque is greater than 0, maintaining the transmission input torque reduction request amount to be requested to be reduced at the beginning of gear shift until the torque phase period is terminated; and
    when the torque phase period is terminated, controlling the transmission input torque reduction request amount to be reduced.

9. The method of claim 8, wherein the transmission input torque reduction request amount is controlled to be reduced with a predetermined inclination and the predetermined inclination is determined depending on the transmission input torque.

10. The method of claim 1, wherein the torque reduction amount decreasing operation further includes:
    when the first-stage gear is not completely engaged, maintaining the transmission input torque reduction request amount applied at the beginning of the gear shift up to a time point at which the first-stage gear is completely engaged while the first-stage gear is completely engaged.

11. The method of claim 10, further including:
    primarily reducing the torque reduction request amount in proportion to an accelerator pedal sensor (APS) opening amount after entrance into the torque phase period.

* * * * *